United States Patent
Nakami

(10) Patent No.: US 8,040,390 B2
(45) Date of Patent: Oct. 18, 2011

(54) ADJUSTMENT FOR OUTPUT IMAGE OF IMAGE DATA

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 976 days.

(21) Appl. No.: 12/001,585

(22) Filed: Dec. 11, 2007

(65) Prior Publication Data

US 2009/0103806 A1 Apr. 23, 2009

Related U.S. Application Data

(63) Continuation of application No. 10/239,820, filed on Sep. 24, 2002, now abandoned.

(30) Foreign Application Priority Data

Feb. 9, 2001 (JP) ................................. 2001-034545

(51) Int. Cl.
*H04N 9/73* (2006.01)
(52) U.S. Cl. .................................. 348/223.1; 348/222.1
(58) Field of Classification Search ............... 348/222.1, 348/223, 224.1, 225.1
See application file for complete search history.

(56) References Cited

U.S. PATENT DOCUMENTS

| | | | |
|---|---|---|---|
| 5,754,227 A * | 5/1998 | Fukuoka | 348/231.6 |
| 5,805,213 A | 9/1998 | Spaulding et al. | |
| 6,011,547 A | 1/2000 | Shiota et al. | |
| 6,064,775 A | 5/2000 | Suzuki et al. | |
| 6,094,539 A | 7/2000 | Abe | |
| 6,151,410 A | 11/2000 | Kuwata et al. | |
| 6,201,932 B1 | 3/2001 | Tsujimoto | |
| 6,273,535 B1 | 8/2001 | Inoue et al. | |
| 6,505,002 B2 | 1/2003 | Fields | |
| 6,563,602 B1 | 5/2003 | Uratani et al. | |
| 6,744,920 B1 | 6/2004 | Sakaida | |
| 6,795,212 B1 * | 9/2004 | Ichikawa | 358/1.9 |
| 7,015,955 B2 | 3/2006 | Funston et al. | |
| 7,057,650 B1 | 6/2006 | Sakamoto | |
| 7,099,022 B1 | 8/2006 | Kawaoka | |
| 7,180,629 B1 | 2/2007 | Nishio et al. | |
| 2002/0044304 A1 | 4/2002 | Ochiai | |
| 2002/0113881 A1 | 8/2002 | Funston et al. | |

(Continued)

FOREIGN PATENT DOCUMENTS

JP 06-008537 1/1994

(Continued)

OTHER PUBLICATIONS

Abstract of Japanese Patent Publication. No. 10-271524, Pub. Date: Oct. 9, 1998, Patent Abstracts of Japan.

(Continued)

*Primary Examiner* — Gevell Selby
(74) *Attorney, Agent, or Firm* — Martine Penilla & Gencarella, LLP

(57) ABSTRACT

When a memory card is inserted into a slot, the control circuit of a color printer obtains image output control information from a memory card and analyzes it. When auto light source is not set as the light source, the CPU references the reference values and coefficients for the characteristics parameters except for color balance and performs correction, and then adjusts the image data image quality to reflect the post-correction characteristics parameters. As a result, it is possible to automatically adjust the image quality of image data without losing the selectively set output conditions.

19 Claims, 11 Drawing Sheets

U.S. PATENT DOCUMENTS

2003/0076420 A1 * 4/2003 Akiyama et al. ............ 348/207.1

FOREIGN PATENT DOCUMENTS

| JP | 08-275010 | 10/1996 |
|---|---|---|
| JP | 09-219817 | 8/1997 |
| JP | 09-307676 | 11/1997 |
| JP | 10-191246 | 7/1998 |
| JP | 10-226139 | 8/1998 |
| JP | 10-271524 | 10/1998 |
| JP | 11-041622 | 2/1999 |
| JP | 11-055688 | 2/1999 |
| JP | 11-088672 | 3/1999 |
| JP | 11-127415 | 5/1999 |
| JP | 11-327605 | 11/1999 |
| JP | 11-331596 | 11/1999 |
| JP | 2000-013718 | 1/2000 |
| JP | 2000-020680 | 1/2000 |
| JP | 2000-137806 | 5/2000 |
| JP | 2001-147481 | 5/2001 |
| JP | 2001-320591 | 11/2001 |
| JP | 2001-320727 | 11/2001 |
| WO | WO 00/04492 | 1/2000 |

OTHER PUBLICATIONS

Abstract of Japanese Patent Publication No. 06-008537, Pub. Date: Jan. 18, 1994, Patent Abstracts of Japan.

Watanabe et al., "An Image Data File Format for Digital Still Camera," Final Program and Advance Printing of Papers, Annual Conference, Imaging on the Information Highway, 1995, pp. 421-424 (XP 000618775).

Abstract of Japanese Patent Publication No. 09-219817, Pub. Date: Aug. 19, 1997, Patent Abstracts of Japan.

Abstract of Japanese Patent Publication No. 09-307676, Pub. Date: Nov. 28, 1997, Patent Abstracts of Japan.

Japan Electronic Industry Development Association (JEIDA), "Digital Still Camera Image File Format Standard," Version 2.1, Jun. 12, 1998, 172 total pages.

Abstract of Japanese Patent Publication No. 10-191246, Pub. Date: Jul. 21, 1998, Patent Abstracts of Japan.

Abstract of Japanese Patent Publication No. 10-226139, Pub. Date: Aug. 25, 1998, Patent Abstracts of Japan.

Abstract of Japanese Patent Publication No. 11-041622, Pub. Date: Feb. 12, 1999, Patent Abstracts of Japan.

Abstract of Japanese Patent Publication No. 11-055688, Pub. Date: Feb. 26, 1999, Patent Abstracts of Japan.

Abstract of Japanese Patent Publication No. 11-088672 Pub. Date: Mar. 30, 1999, Patent Abstracts of Japan.

Abstract of Japanese Patent Publication No. 11-127415, Pub. Date: May 11, 1999, Patent Abstracts of Japan.

Abstract of Japanese Patent Publication. No. 11-327605, Pub. Date: Nov. 26, 1999, Patent Abstracts of Japan.

Abstract of Japanese Patent Publication. No. 11-331596, Pub. Date: Nov. 30, 1999, Patent Abstracts of Japan.

Abstract of Japanese Patent Publication. No. 2000-013718, Pub. Date: Jan. 14, 2000, Patent Abstracts of Japan.

Abstract of Japanese Patent Publication. No. 2000-020680, Pub. Date: Jan. 21, 2000, Patent Abstracts of Japan.

Abstract of Japanese Patent Publication. No. 2000-137806, Pub. Date: May 16, 2000, Patent Abstracts of Japan.

Abstract of Japanese Patent Publication. No. 2001-147481, Pub. Date: May 29, 2001, Patent Abstracts of Japan.

Abstract of Japanese Patent Publication. No. 2001-320591, Pub. Date: Nov. 16, 2001, Patent Abstracts of Japan.

Abstract of Japanese Patent Publication. No. 2001-320727, Pub. Date: Nov. 16, 2001, Patent Abstracts of Japan.

Abstract of Japanese Patent Publication. No. 08-275010, Pub. Date: Oct. 18, 1996, Patent Abstracts of Japan.

* cited by examiner

| Tag Name | Parameter Value |
|---|---|
| Exposure Time | 1/137 seconds |
| Lens F Value | F 10.1 |
| Exposure Correction Volume | EV 0.4 |
| Release F Value | F 2.0 |
| Lens Focal Distance | 20.70 (mm) |
| Color Space Information | sRGB |
| Light Source | 0 |

112 Additional Information Storage Area

ADJUSTMENT FOR OUTPUT IMAGE OF IMAGE DATA

CROSS-REFERENCE TO RELATED APPLICATION

This application is a continuation of U.S. application Ser. No. 10/239,820, filed on Sep. 24, 2002 now abandoned, the disclosure of which is incorporated by reference herein.

TECHNICAL FIELD

The present invention relates to image adjusting technology for adjusting the image quality of image data.

BACKGROUND ART

The image quality of image data generated by devices such as digital still cameras (DSC), digital video cameras (DVC), and scanners can be adjusted at will by using an image retouch application on a personal computer. Image retouch applications generally are equipped with an image adjustment function that automatically adjusts the image quality of image data, and if this image adjustment function is used, it is possible to easily improve the image quality of image data output from an output device. Devices such as CRTs, LCDs, printers, projectors, and television receivers are known as image file output device.

The printer driver that controls the operation of a printer, which is one output device, is also equipped with a function that automatically adjusts the image quality of image data, and it is also possible to easily improve the image quality of printed image data by using this kind of printer driver.

However, with the automatic image adjustment functions provided by the image retouch application and printer driver, image quality corrections are executed with image data having typical image quality characteristics as a standard. In comparison to this, it is possible to generate image data which is the target of image processing under a variety of conditions, so there are cases when it is not possible to improve image quality even when the automatic image adjustment function is uniformly executed and the image quality parameter values of the image data are changed using a stipulated value.

Also, among the image data generating devices such as DSCs, there are devices with which the image quality of the image data can be adjusted freely at the time the image data is generated, and the user can intentionally generate image data that has a specific image quality. In comparison to this kind of image data, when the automatic image quality adjustment function is executed, there was the problem that the adjustment would be automatically done based on image quality that uses as a standard even the intentional image quality that the image data has, so that there are cases when it was not possible to execute automatic image adjustment that reflected that intentions of the user. Note that this type of problem is not limited to DSCs, but is a common problem to other image data generating devices such as DVCs as well.

DISCLOSURE OF THE INVENTION

The present invention was created to solve the problems noted above, and its purpose is to automatically make suitable adjustments to image quality that correspond to each image data. Another purpose is to automatically adjust the image quality of image data without losing the selectively set output conditions.

The first aspect of the present invention for solving the problems noted above provides an output device that output s image data using image data and image output control information that includes at least light source information at the time of image data generation and that is associated with the image data. The output device of the first aspect of the present invention comprises image adjustment means that adjusts the color balance of the image data based on the light source information that is included in the image output control information, and image data output means that outputs image data for which the image quality has been adjusted.

With the output device of the first aspect of the present invention, the color balance for the image quality adjustment is adjusted based on the light source information that is included in the image output control information, so it is possible to appropriately automatically adjust the image quality that corresponds to each image data, and it is also possible to automatically adjust the image quality of image data without losing the selectively set output conditions, specifically, the output conditions related to the light source.

The output device of the first aspect of the present invention is further comprises light source information determination means that analyzes the image output control information and determines whether the light source information was automatically set, and image quality adjustment control means that prohibits adjustment of the color balance for the image quality adjustment means when it is determined that the light source information was not automatically set. Alternatively, the first aspect of the present invention may also comprises image quality adjustment control means that decreases the level of adjustment of the color balance for the image quality adjustment means when it is determined that the light source information was not automatically set.

With the output device of the first aspect of the present invention, when it is determined that the light source information was not automatically set, the adjustment of the color balance for the image quality adjustment is either prohibited or the level of adjustment is decreased, so it is possible to appropriately automatically adjust the image quality corresponding to each image data, and it is also possible to automatically adjust the image quality of image data without losing the selectively set output conditions, specifically, the output conditions related to the light source.

In the output device of the first aspect of the present invention, the image quality adjustment means may include an image quality parameter value obtaining means that analyzes the image data and obtains the values of the image quality parameters that show the characteristics of the image data, and adjust the image quality of the image data based on the obtained image quality parameter values and reference image quality parameter values set in advance.

With this structure, the image quality of the image data is corrected based on the reference image quality parameters and the image quality parameters, so it is possible to output image data with the appropriate image quality.

In the output device of the first aspect of the present invention, the image adjustment means can calculate the image quality adjustment volume from the reference image quality parameter values and the image quality parameter values, modify the image quality adjustment volume to reflect the light source information, and adjust the image quality of the image data using the modified image quality adjustment volume. With this structure, it is possible to more appropriately automatically adjust the image quality of each image data to reflect the light source information.

In the output device of the first aspect of the present invention, the image adjustment means can also adjust the image quality of the image data so that the difference between the reference image quality parameter values and the image quality parameter values is reduced or eliminated to reflect the light source information. With this structure, it is possible to more appropriately automatically adjust the image quality of each image data to reflect the light source information.

The output device of the first aspect of the present invention can further comprises reference image quality parameter value modification means that analyzes the image output control information and modifies the reference image quality parameter values in relation to the image quality parameter values, and the image quality adjustment means can adjust the image quality of the image data based on the modified reference image quality parameter values and the obtained image quality parameter values. With this structure, it is possible to modify the reference image quality parameter values to match the characteristics of each image data, so it is possible to more appropriately automatically adjust the image quality of the image data while reflecting the characteristics of the image data. Note that it is also possible to have the white balance information that is used when generating the image data be included in the light source information.

The second aspect of the present invention provides an image data processing device that processes image data using image output control information that contains at least image data and light source information when the image data was generated and which is also associated with the image data. The image data processing device of the second aspect of the present invention comprises a acquiring means that acquires the image data and the image output control information, image parameter value obtaining means that analyzes the image data and obtains the values of the image quality parameters that show the characteristics of the image data, and image quality adjustment means that adjusts the color balance of the image data based on reference image quality parameter values that were set in advance, the light source information that is included in the image output control information, and the obtained image quality parameter values.

With the image data processing device of the second aspect of the present invention, it is possible to obtain the same effect as the output device of the first aspect of the present invention. The image data processing device of the second aspect of the present invention may have the same various aspects as those of the output device of the first aspect of the present invention.

The third aspect of the present invention provides a method of adjusting image quality of image data. The method of the third aspect of the present invention comprises obtaining image data and image output control data which includes at least light source information at the time of image data generation and that is associated with the image data, analyzing the image output control information and determines whether the light source information was set automatically, and adjusting the image quality of said obtained image data excluding adjustment of color balance when it is determined that said light source information was not set automatically.

With the method of the third aspect of the present invention, it is possible to obtain the same effects as the output device of the first aspect of the present invention. It is also possible for the method of the third aspect of the present invention to be implemented in various aspects that are the same as those of the output device of the first aspect of the present invention.

The fourth aspect of the present invention provides a medium that can be read by a computer on which is stored a program for adjusting the image quality of the image data.

The program stored on a computer readable medium of the fourth aspect instructs a computer to execute functions of obtaining image data and image output control information that includes at least light source information at the time of image data generation and that is associated with the image data, and adjusting the image quality of the image data including color balance based on the light source information that is contained in the image output control information.

With the computer readable medium of the fourth aspect, it is possible to obtain the same effects as the output device of the first aspect of the present invention. It is also possible for the computer readable medium of the fourth aspect of the present invention to be implemented in various aspects that are the same as those of the output device of the first aspect of the present invention.

The fifth aspect of the present invention provides an image data generating device that generates image data that is associated with the image processing conditions of the image data in the output device. The image data generating device of the fifth aspect comprises image data generating means that generates image data, light source information obtaining means that obtains light source information, image quality parameter value obtaining means that analyzes the generated image data and obtains the values of image quality parameters that show the characteristics at least relating to color balance of the image data, image processing condition generating means that generates the image processing conditions based on reference image quality parameters set in advance, the obtained image quality parameters, and the light source information, and output means that correlates and outputs the generated image processing conditions and image data.

With the image data generating device of the fifth aspect of the present invention, it is possible to generate image processing conditions for the output device based on reference image quality parameters set in advance, obtained image quality parameters, and light source information. Therefore, it is possible to adjust the color balance based on the light source information, making it possible to appropriately automatically adjust the image quality corresponding to each image data and to automatically adjust the image quality of image data without losing the selectively set output conditions, specifically, the output conditions relating to the light source. Note that it is also possible to correlate and store image data and image processing conditions in the same file.

DESCRIPTION OF THE PREFERRED EMBODIMENTS

Figure 1:
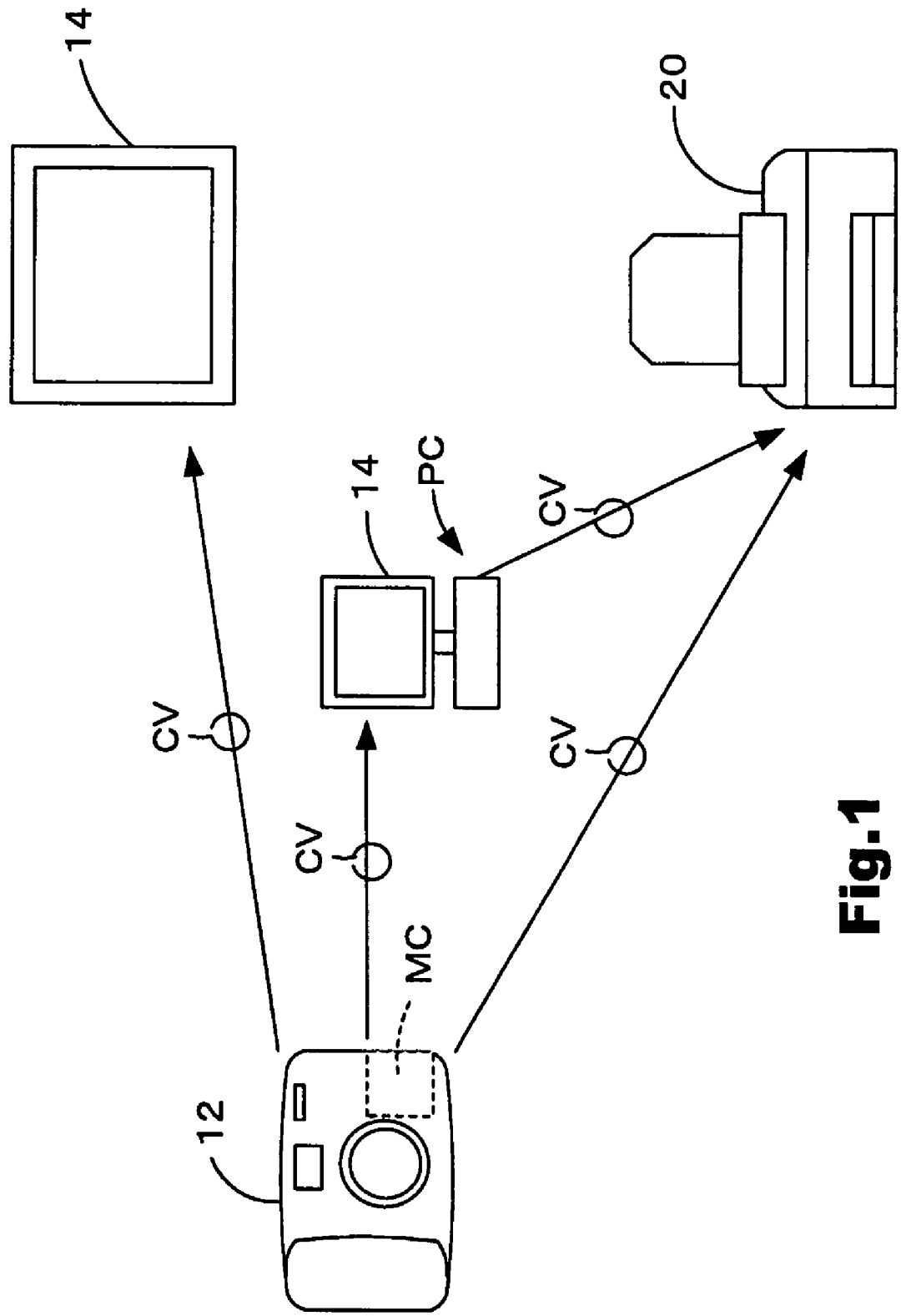
FIG. 1 is an explanatory diagram that shows an example of an image data output system that can use the image output device of this embodiment.
Figure 2:
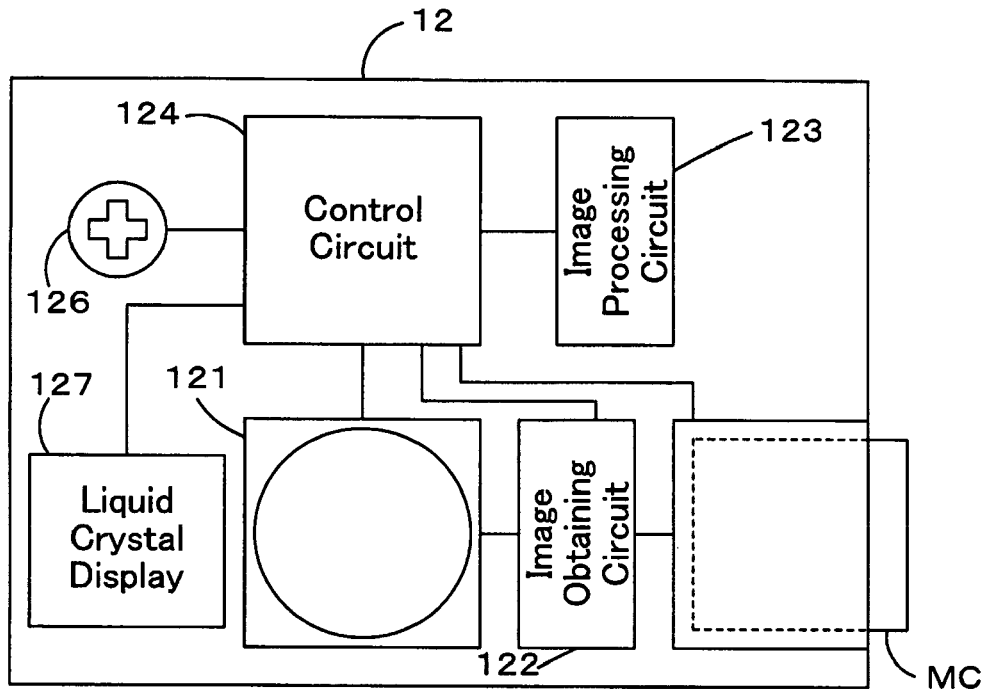
FIG. 2 is a block diagram that shows the schematic structure of a digital still camera that can generate an image file (image data) output by the image output device of this embodiment.

The adjustment of output images for image files of the present invention will be explained based on following several embodiments with referring to the figures in the sequence noted below.
A. Structure of an Image Data Output System
B. Structure of Image Files
C. Structure of an Image Data Output System That Can Use Image Files
D. Image Processing with Digital Still Cameras
E. Image Processing with Printers
F. Other Embodiments
A. Structure of an Image Data Output System:

The structure of an image data output system, which can use the image output device that realizes image output adjustment of this embodiment, will be explained with referring to FIGS. 1 and 2. FIG. 1 is an explanatory diagram that shows an example of an image data output system that can use the image output device of the first embodiment. FIG. 2 is a block diagram that shows the schematic structure of a digital still camera that can generate an image file (image data) output by the image output device of the first embodiment.

Image data output system 10 comprises digital still camera 12 as an input device that generates image files and color printer 20 as an output device that executes image processing based on the image file generated by digital still camera 12 and outputs an image. As an output device, in addition to color printer 20, it is also possible to use devices such as a CRT display, a monitor 14 such as an LCD display, or a projector, but with the explanation below, color printer 20 is used as the output device.

Digital still camera 12 is a camera that obtains images by imaging light information in a digital device (CCD or multiplier phototube), and as shown in FIG. 2, it comprises optical circuit 121 which includes a CCD, etc. for gathering light information, an image obtaining circuit 122 for obtaining images by controlling optical circuit 121 an image processing circuit 123 for doing processing of the obtained digital image, and a control circuit 124 that is equipped with memory and that controls each circuit. Digital still camera 12 saves the obtained image as digital data in a memory card MC as a storage device. As the saving format for image data in digital still camera 12, JPEG format is generally used, but it is also possible to use other saving formats such as TIFF format, GIF format, BMP format, and RAW data format.

Digital still camera 12 also comprises a selection and setting button 126 for setting things such as the photo mode, exposure correction, and light source, and a liquid crystal display 127 for previewing the shot images and for setting things such as the photo mode using selection and setting button 126. The light source set for digital still camera 12 is set by specifying a light source, and can be set to settings such as automatic setting (AUTO), daylight, fluorescent light, or tungsten. As is clear to those in the industry, the light source set for digital still camera 12 more specifically means the white balance used when shooting under the specified light source. Specifically, the light sources called daylight, fluorescent light, and tungsten do not simply mean the light source during shooting, but also mean the white balance given in advance (preset) on the side of digital still camera 12 for each light source. Normally, the auto light source (AWB: auto white balance) for which the light source (white balance) at the time of shooting on the digital still camera 12 is automatically confirmed and which is automatically corrected is set as a default value for the light source for digital still camera 12. When shooting is done using the auto light source, 0, for example, is recorded as the light source specifying parameter value.

The digital still camera 12 used in this image data output system 10 has, in addition to image data GD, the image output control information GI of the image data stored as image file GF in memory card MC. Specifically, image output control information GI is automatically stored in memory card MC together with image data GD at the time of shooting as image file GF. Also, when the user selects in advance a photo mode of portrait or landscape, the parameter values of the image quality parameters corresponding to the selected photo mode are stored as image output control information GI contained in image file GF in memory card MC, and when any value is set for parameters such as the exposure correction volume or the photo mode, the setting values of the set parameters are thus stored.

For digital still camera 12, when shooting is executed using the auto shooting mode, the values of parameters such as exposure time, light source, aperture, shutter speed, and lens focal distance during shooting are stored in the memory card MC as image output control information contained in an image file GF. Note that parameters used for each photo mode as well as the parameter values are held in memory in control circuit 124 of digital still camera 12.

Figure 3:
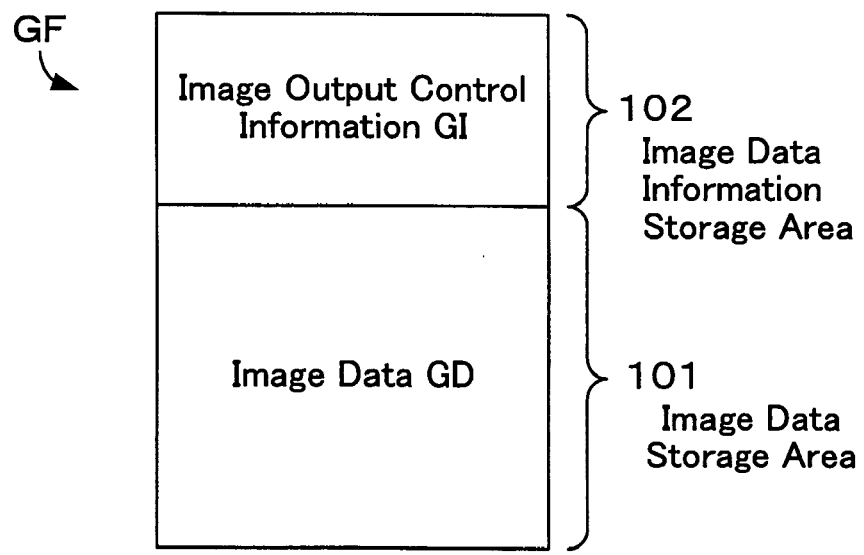
FIG. 3 is an explanatory diagram that conceptually shows the internal structure of an image file that can be used for this embodiment.

The image file GF generated with digital still camera 12 is sent to color printer 20 via, for example, a cable CV or computer PC, or via a cable CV. Or, the image file is sent to color printer 20 via a computer PC for which the memory card MC on which the image file GF is stored by digital still camera 12 is inserted into a memory card slot, or, is sent by directly connecting the memory card MC to printer 20. The explanation provided hereinbelow will relate to the case in which the memory card is directly connected to the color printer 20.
B. Structure of Image Files:

The schematic structure of image files that can be used with this embodiment will be described with FIG. 3. FIG. 3 is an explanatory diagram that conceptually shows the internal structure of an image file that can be used for this embodiment. Image file GF comprises an image data storage area 101 that stores image data GD and an image output control information storage area 102 that stores information that controls the image data output status (image output control information) GI. Image data GD is stored in JPEG format, for example, and image output control information GI is stored in TIFF format. Note that the terms file structure, data structure, and storage area used in this embodiment mean the file or data image for which the file, data, etc. is in a state stored within the recording device.

Image output control information GI is information (image quality generating information) related to the image quality when image data is generated (shot) using an image data generating device such as digital still camera 12, and this can include parameters relating to the exposure time, ISO sensitivity, aperture, shutter speed, and focal distance generated automatically while shooting as well as output control parameters such as exposure correction, light source, photo mode, and target color space set freely by the user.

The image file GF noted above of this embodiment can be generated not only by digital still camera 12 but also by an input device (image file generating device) such as a digital video camera or a scanner.

The image file GF of this embodiment can basically comprise the image data area 101 and image output control information storage area 102 noted above, and can use a file structure according to an already standardized file format. Following, a detailed explanation of a case when the image file GF of this embodiment is used for a standardized file format will be described.

Figures 4, 5:
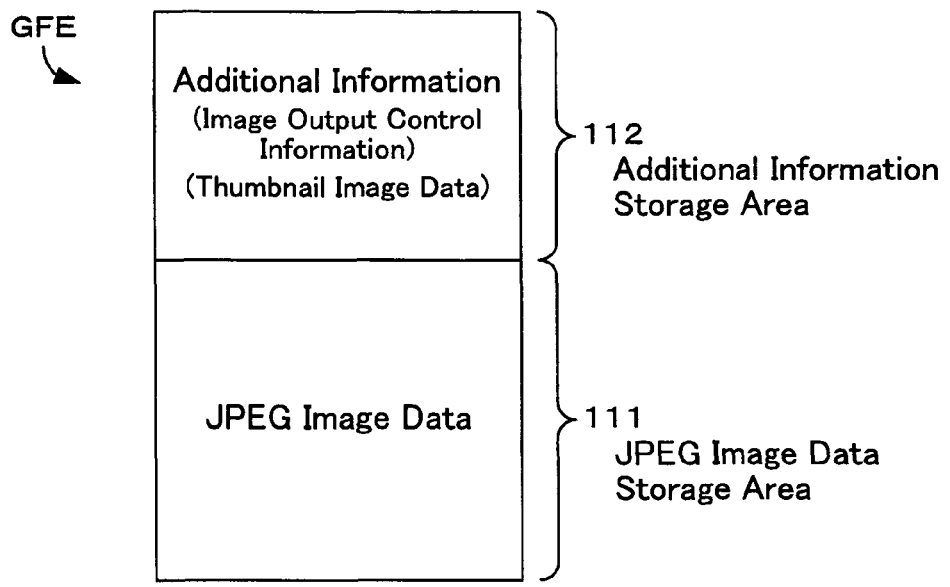
FIG. 4 is an explanatory diagram that shows the schematic internal structure of an image file stored in an Exif file format.
FIG. 5 is an explanatory diagram that shows an example of the data structure of additional information storage area 112 of an image file GF that can be used for this embodiment.

The image file GF of this embodiment can have a file structure according to the digital still camera image file format standard (Exif), for example. The Exif file specifications are set by the Japanese Electronics and Information Technology Industries Association (JEITA). The schematic structure inside the file for an example when the image file GF of this embodiment has a file format according to this Exif file format will be described with FIG. 4. FIG. 4 is an explanatory diagram that shows the schematic internal structure of the image file of this embodiment stored in an Exif file format.

Image file GFE which is an Exif file comprises JPEG image data storage area 111 which stores JPEG format image data and additional information storage area 112 which stores various types of information relating to the stored JPEG image data. JPEG data storage area 111 correlates to image data storage area 101 noted above, and additional information storage area 112 correlates to image output control information storage area 102 noted above. Specifically, image output control information (image output control information GI) which is referred to when outputting a JPEG image such as shooting date and time, exposure, shutter speed, light source, exposure correction, and target color space is stored in additional information storage area 112. In addition to image output control information GI, thumbnail image data of the JPEG images stored in JPEG image data storage area 111 is also stored in TIFF format in additional information storage area 112. Note that as is known by those in the industry, with Exif format files, tags are used to characterize each data, and each data may be called by its tag name.

The detailed data structure of additional information storage area 112 will be described with FIG. 5. FIG. 5 is an explanatory diagram that shows an example of the data structure of additional information storage area 112 of an image file GF that can be used for this embodiment.

As shown in the figure, parameter values for information such as the exposure time, lens F value, exposure control mode, ISO sensitivity, exposure correction volume, light source, flash, and focal distance are stored according to a preset address in additional information storage area 112. On the output device side, it is possible to obtain image output control information GI by specifying an address that corresponds to the desired information (parameters).

Figure 6:
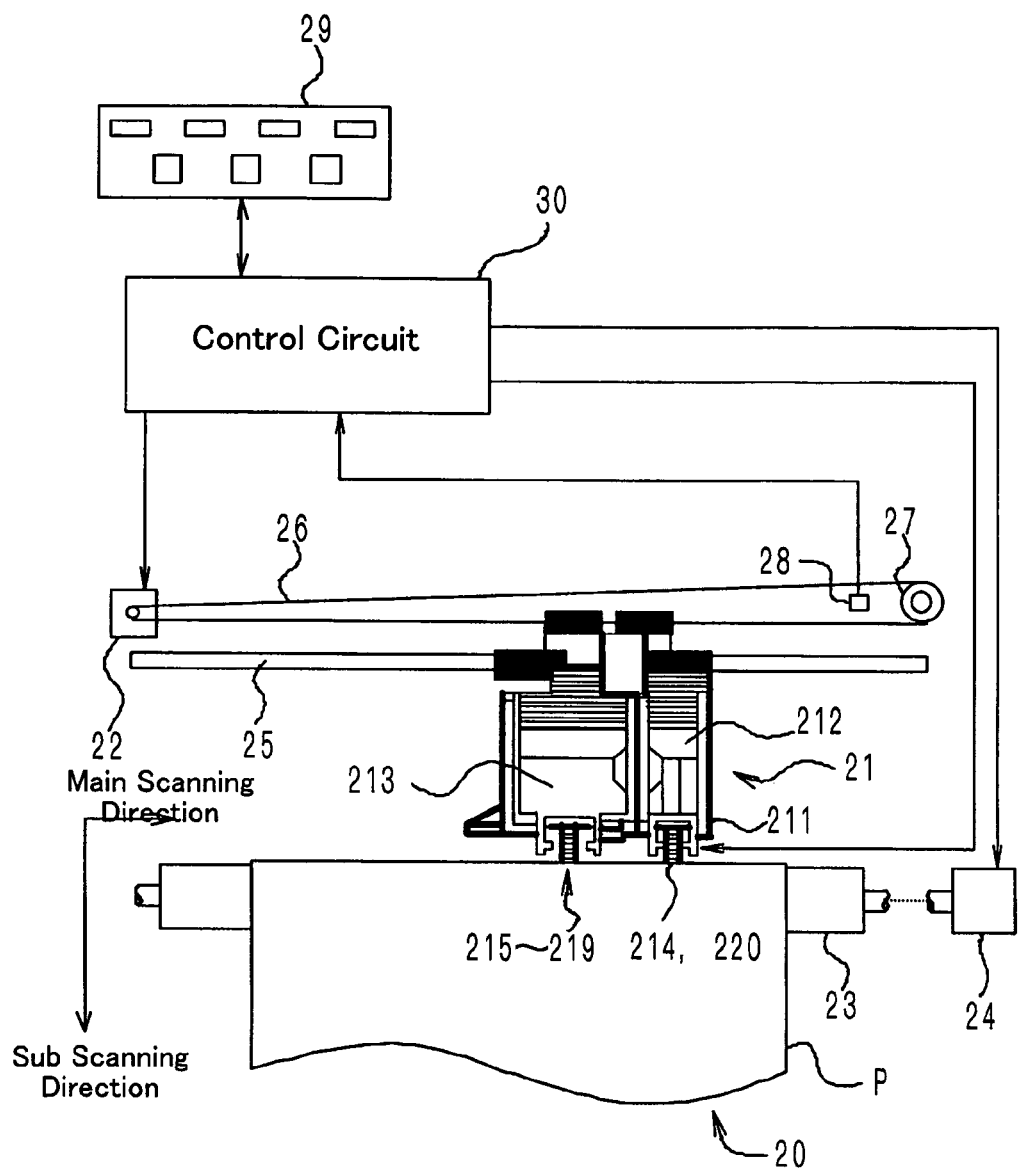
FIG. 6 is a block diagram that shows the schematic structure of the color printer 20 of this working embodiment.

C. Structure of an Image Data Output System that can Use Image Files:

The schematic structure of the image output device of this embodiment, specifically, color printer 20 will be described with FIG. 6. FIG. 6 is a block diagram that shows the schematic structure of the color printer 20 of this working embodiment.

Color printer 20 is a printer capable of outputting color images, and is an inkjet printer that forms an image by forming a dot pattern by spraying colored ink on a printing medium, for example four colors including cyan (C), magenta (M, yellow (Y), and black (K). Or, it is an electrophotographic printer that forms an image by transferring and fixing color toner on a printing medium. For the colored ink, in addition to the four colors noted above, it is also possible to use light cyan (LC), light magenta (LM), and dark yellow (DY).

As shown in the figure, color printer 20 is formed from a mechanism that performs ink spraying and dot formation by driving printing head 211 that is built into carriage 21, a mechanism that carries this carriage 21 back and forth in the axial direction of platen 23 using carriage motor 22, a mechanism that carries printing paper P using paper feed motor 24, and a control circuit 30. The mechanism that takes carriage 21 back and forth in the axial direction of platen 23 is formed from items such as sliding axis 25 for which carriage 21 is supported in parallel with platen 23 and is held so as to be able to slide, pulley 27 on which is extended seamless drive belt 26 with carriage motor 22, and position detection sensor 28 which detects the origin point position of carriage 21. The mechanism that carries printing paper P is composed from platen 23, paper feed motor 24 which rotates platen 23, a paper supply auxiliary roller which is not illustrated, and a gear train (not shown) that conveys the rotation of paper feed motor 24 to platen 23 and the paper supply auxiliary roller.

Control circuit 30 appropriately controls the movement of paper feed motor 24, carriage motor 22, and printing head 211 while exchanging signals with the printer's operating panel 29. Printing paper P supplied to color printer 20 is set so as to be sandwiched between platen 23 and the paper supply auxiliary roller, and feeds only a specific volume according to the rotation angle of platen 23.

Ink cartridge 212 and ink cartridge 213 are mounted in carriage 21. Ink cartridge 212 holds black (K) ink, and ink cartridge 213 holds other inks, specifically the three colors cyan (C), magenta (M), and yellow (Y), as well as light cyan (LC), light magenta (LM), and dark yellow (DY) for a total of six colors of ink.

Figure 7:
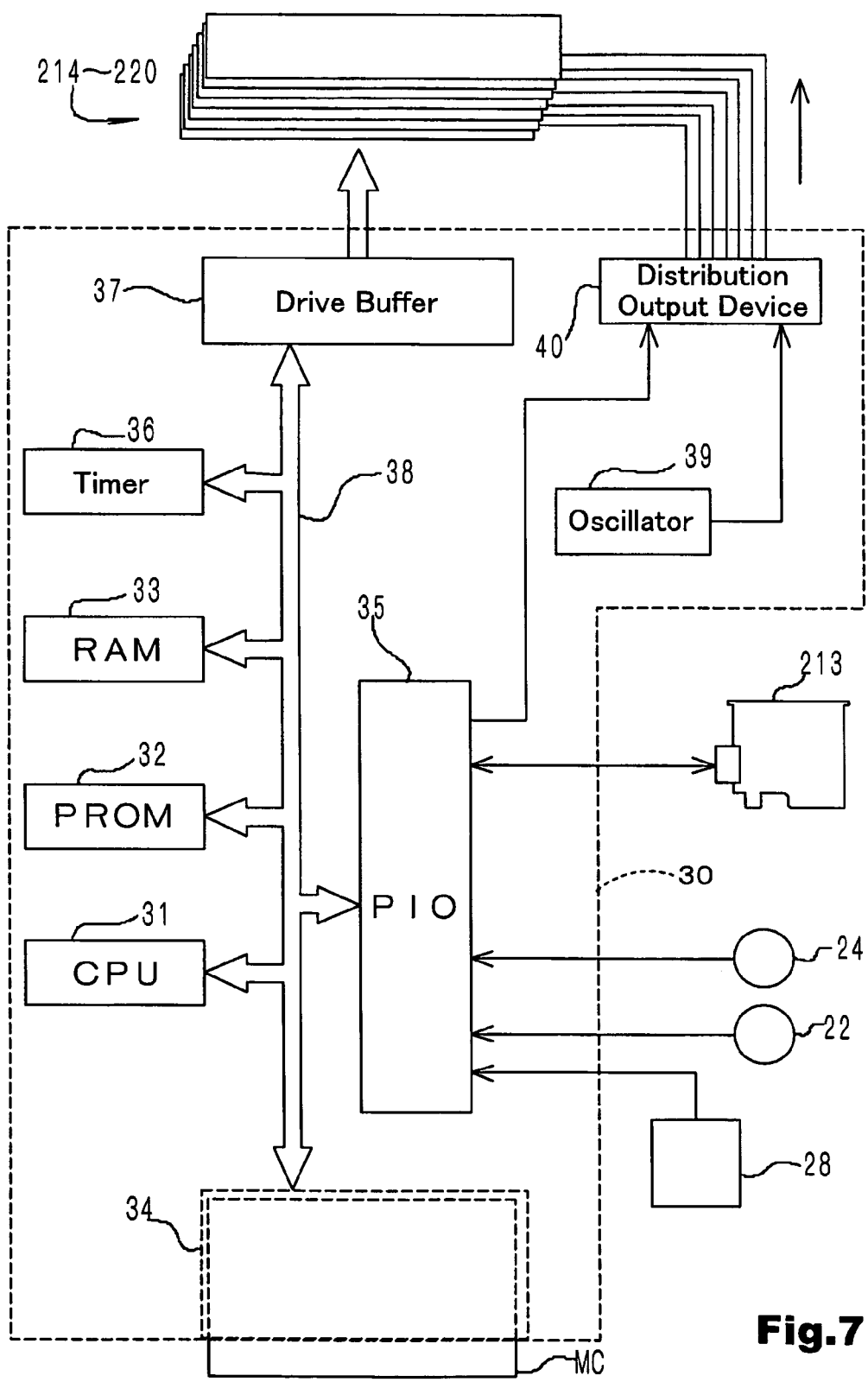
FIG. 7 is an explanatory diagram that shows the internal structure of control circuit 30 of color printer 20.

Next, the internal structure of control circuit 30 of color printer 20 will be described with FIG. 7. FIG. 7 is an explanatory diagram that shows the internal structure of control circuit 30 of color printer 20. As shown in the figure, provided within control circuit 30 are CPU 31, PROM 32, RAM 33, PCMCIA slot 34 that obtains data from memory card MC, peripheral device I/O unit (PIO) 35 which exchanges data with paper feed motor 24 and carriage motor 22, etc., timer 36, and drive buffer 37. Drive buffer 37 is used as a buffer that supplies dot on and off signals to ink spray heads 214 through 220. These are connected to each other via bus 38, and can exchange data with each other. Also provided in control circuit 30 are oscillator 39 which outputs drive waveforms at a specified frequency, and distribution output device 40 which distributes the output from oscillator 39 at a specified timing to ink spray heads 214 through 220.

Control circuit 30 reads image file 100 from memory card MC, analyzes additional information AI, and executes image processing based on the analyzed control information AI. Control circuit 30 outputs dot data at a specified timing to drive buffer 37 while staying synchronous with the movement of paper feed motor 24 and carriage motor 22. A detailed explanation of the image processing flow executed by control circuit 30 will be explained below.

Figure 8:
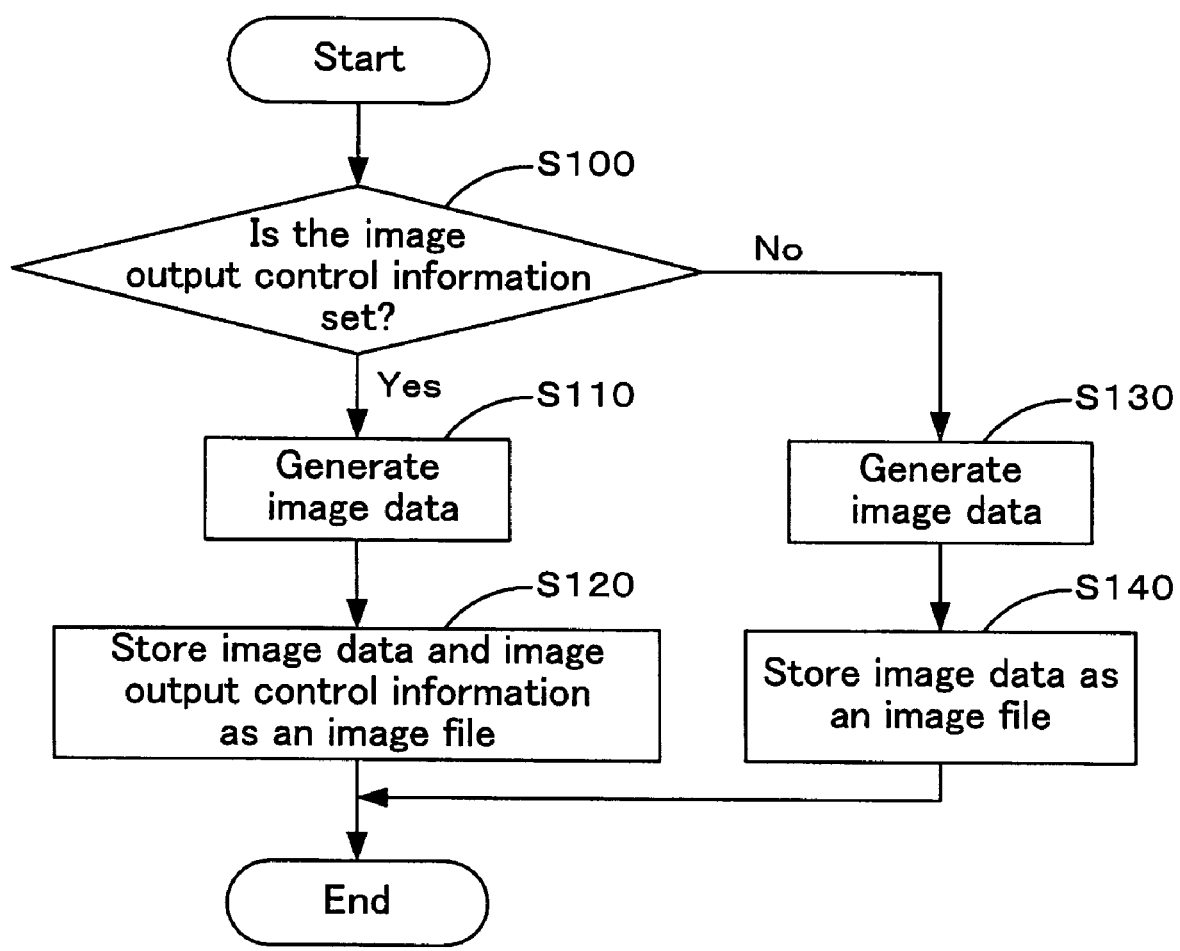
FIG. 8 is a flow chart that shows the flow of process of generating an image file GF with digital still camera 12.

D. Image Processing with Digital Still Cameras:

The image processing of digital still camera 12 will be explained with FIG. 8. FIG. 8 is a flow chart that shows the flow of process of generating an image file GF with digital still camera 12.

Control circuit 124 of digital still camera 12 determines (step S100) whether the photo mode or image output control information such as the light source or exposure correction volume was set by the user before shooting. These image output control information settings are executed by the user operating selection and setting button 126, and then selecting from the photo modes prepared in advance that are displayed on liquid crystal display 127. Alternatively, they are executed by the user similarly operating selection and setting button 126 and changing the setting values on liquid crystal display 127.

When it is determined that image output control information is set (Yes at step S100), control circuit 124 generates image data GD (step S110) using the parameter values stipulated by the set image output control information according to a shooting request, such as pressing of the shutter button. Control circuit 124 stores (step S120) the generated image data GD and the image output control information GI that includes selectively set output conditions and automatically given output conditions on memory card MC, and ends this processing routine. The data generated with digital still camera 12 is converted from the RGB color space and expressed using the YCbCr color space.

In comparison to this, when it is determined that image output control information is not set (No at step S100), control circuit 124 generates image data GD according to a shooting request (step S130). Control circuit 124 stores the generated image data GD and the image output control information GI that contains output conditions given automatically when the image data was generated as image file GF in memory card MC (step S140) and ends this processing routine.

With the processing noted above executed with digital still camera 12, the image file GF that is stored in memory card MC comprises image data GD as well as image output control information GI that includes the values of each parameter at the time the image data was generated.

Figure 9:
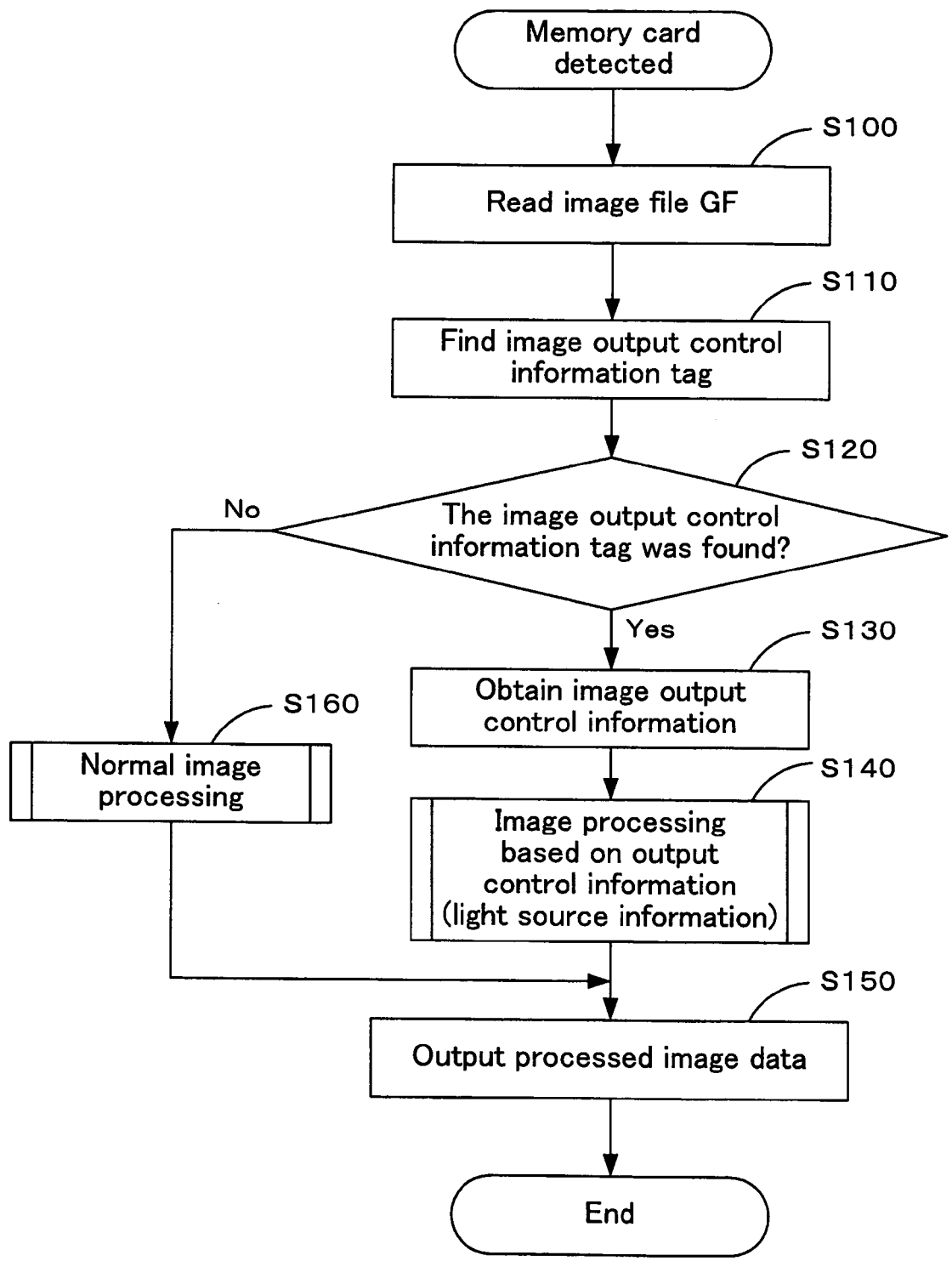
FIG. 9 is a flow chart that shows the processing routine of the printing process for color printer 20 of this embodiment.
Figure 10:
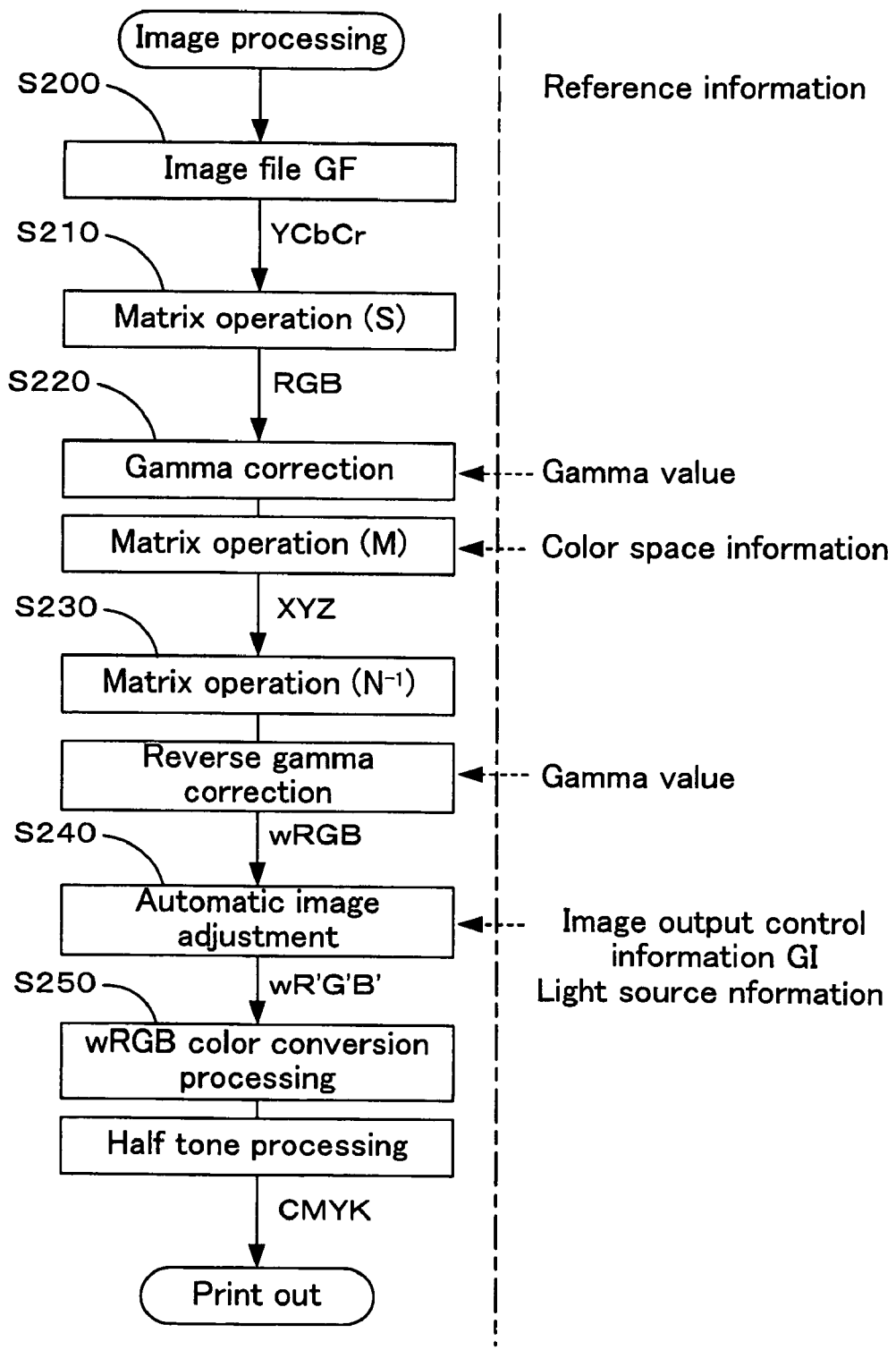
FIG. 10 is a flow chart that shows the flow of image processing for color printer 20 of this embodiment.
Figure 11:
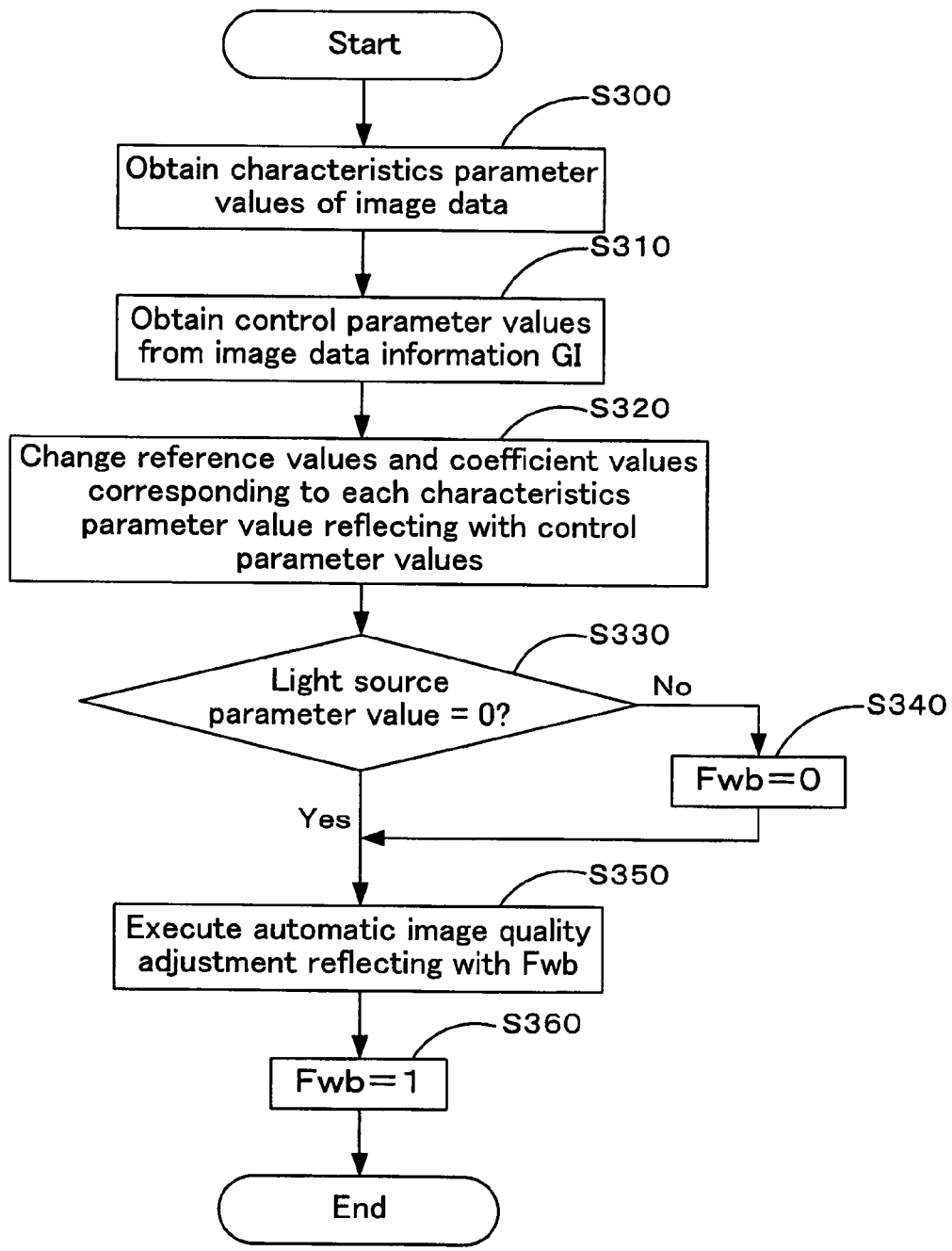
FIG. 11 is a flow chart that shows the processing routine for automatic image adjustment for color printer 20.

E. Image Processing with Color Printer 20:

The image processing with the color printer 20 of this embodiment will be explained with FIGS. 9 through 11. FIG. 9 is a flow chart that shows the processing routine of the printing process for color printer 20 of this embodiment. FIG. 10 is a flow chart that shows the flow of image processing for color printer 20 of this embodiment. FIG. 11 is a flow chart that shows the processing routine for automatic image adjustment for color printer 20. Note that the image processing of color printer 20 according to this embodiment first executes color space conversion processing and then executes automatic image adjustment.

When memory card MC is inserted into slot 34, the control circuit 30 (CPU 31) of color printer 20 reads image file 100 from memory card MC and temporarily stores the read image file 100 in RAM 33 (step S100). CPU 31 searches for the image output control information GI that shows the information when the image data was generated from additional information storage area 102 of the read image file 100 (step S110). When CPU 31 was able to search for and find the image output control information (Yes at step S120), it obtains image output control information GI of when the image data was generated and analyzes it (step S130). CPU 31 executes image processing to be described later (step S140) based on the analyzed image output control information GI, and then prints out the processed image data (step S150).

When CPU 31 could not search for and find the image output control information (No at step S120), it cannot reflect the image output control information at the time the image data was generated, so it obtains the image output control information held by color printer 20 as the default in advance, specifically, the various parameter values, from ROM 32, and executes normal image processing (step S160). CPU 31 prints out the processed image data (step S150) and ends this processing routine.

A detailed explanation of the image processing executed with color printer 20 will be explained with FIG. 10. CPU 31 of color printer 20 fetches image data GD from the read image file GF (step S200). As described previously, digital still camera 12 has the image data stored as a JPEG format file, and with a JPEG file, image data is saved using the YCbCr color space to increase the compression rate.

To convert image data based on the YCrCb color space to data based on the RGB color space, CPU 31 executes a 3×3 matrix operation S (step S210). Matrix operation S is the operational expression shown below.

$$\begin{pmatrix} R \\ G \\ B \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

CPU 31 executes gamma correction as well as matrix operation M on the image data based on the RGB color space obtained in this way (step S220). When executing gamma correction, CPU 31 obtains the DSC side gamma value from image output control information GI, and executes gamma conversion processing on the video image data using the obtained gamma value. Matrix operation M is an operational process for converting RGB color space to XYZ color space. The image file GF used with this embodiment can include the color space information at the time the image was generated, so when image file GF includes the color space information, CPU 31 references the color space information when executing matrix operation M, and executes the matrix operation using the matrix (M) that corresponds to the color space at the time the image was generated. Matrix operation M is the operational expression below.

$$\begin{pmatrix} X \\ Y \\ Z \end{pmatrix} = M \begin{pmatrix} Rt' \\ Gt' \\ Bt' \end{pmatrix}$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$$Rt, Gt, Bt \geq 0$$

$$Rt' = \left(\frac{Rt}{255}\right)^{\gamma}$$

$$Gt' = \left(\frac{Gt}{255}\right)^{\gamma}$$

-continued $$Bt' = \left(\frac{Bt}{255}\right)^{\gamma}$$

$$Rt, Gt, Bt < 0$$

$$Rt' = -\left(\frac{-Rt}{255}\right)^{\gamma}$$

$$Gt' = -\left(\frac{-Gt}{255}\right)^{\gamma}$$

$$Bt' = -\left(\frac{-Bt}{255}\right)^{\gamma}$$

The color space of the image data GD obtained after executing matrix operation M is the XYZ color space. In the past, the color space used when doing image processing with a printer or computer was fixed as sRGB, and it was not possible to effectively use the color space that digital still camera 12 has. In comparison to this, with this embodiment, a printer (printer driver) is used that changes matrix (M) used for matrix operation M to correspond to the color space information when color space information is included in image file GF. Therefore, it is possible to effectively use the color space that digital still camera 12 has and to realize correct color reproduction.

To execute image adjustment based on any information, CPU 31 executes a process of converting the color space of the image data GD from the XYZ color space to the wRGB color space, specifically matrix operation $N^{-1}$ and a reverse gamma correction (step S230). Note that the wRGB color space is a broader color space than the sRGB color space. When the gamma correction is executed, CPU 31 obtains the printer side default gamma value from ROM 32, and using a reciprocal number to the obtained gamma value, executes reverse gamma conversion processing on the video image data. When executing matrix operation $N^{-1}$, CPU 31 executes the matrix operation using a matrix ($N^{-1}$) from ROM 31 that corresponds to the conversion to the wRGB color space. Matrix operation $N^{-1}$ is the operational expression below.

$$\begin{pmatrix} Rw \\ Gw \\ Bw \end{pmatrix} = N^{-1} \begin{pmatrix} X \\ Y \\ Z \end{pmatrix}$$

$$N^{-1} = \begin{pmatrix} 3.30572 & -1.77561 & 0.73649 \\ -1.04911 & 2.1694 & -1.4797 \\ 0.0658289 & -0.241078 & 1.24898 \end{pmatrix}$$

$$Rw' = \left(\frac{Rw}{255}\right)^{1/\gamma}$$

$$Gw' = \left(\frac{Gw}{255}\right)^{1/\gamma}$$

$$Bw' = \left(\frac{Bw}{255}\right)^{1/\gamma}$$

The color space of the image data GD obtained after executing matrix operation $N^{-1}$ is the wRGB color space. As described previously, this wRGB space is a broader color space than the sRGB color space, and corresponds to the color space that can be generated with digital still camera 12.

CPU 31 executes automatic adjustment processing of the image quality (step S240). With the automatic image quality adjustment processing of this embodiment, the image data contained in the image file GF is analyzed, the values of characteristics parameters that shows the image quality are obtained, and image quality is automatically adjusted to reflect the image output control information GI included in image file GF with correction of the obtained characteristics parameter values. A detailed explanation of this automatic image quality adjustment processing will be explained with FIG. 11.

CPU 31 first analyzes the image data GD and obtains the values of the various types of characteristics parameters that show the characteristics of the image data GD, and temporarily stores these in RAM 32 (step S300). CPU 31 analyzes the image output control information GI, and obtains the values of control parameters (information) that control (specify) image output such as light source, exposure correction volume, exposure time, aperture, ISO, and focal distance (step S310).

While reflecting the values of the obtained control parameters, CPU 31 changes (corrects) the reference values and coefficients set for each parameter (step S320). The reference values and coefficients set for each parameter are values that assume the image data generated with the typical image generating conditions (output control conditions). In light of this, to realize the automatic image quality adjustment to accurately reflect the intention of the person shooting the image (person generating the image), the reference values and coefficients are changed taking into consideration each output control condition, especially the output control conditions that can be set freely by the person shooting the image. Note that the reference values and coefficients are index values of the parameters which will provide optimal image output results predetermined by an image evaluation done using a quantitative evaluation and an induction evaluation.

CPU 31 determines whether, of the obtained control parameters, the value of the light source specification parameter is 0, specifically, determines whether during shooting, the light source conditions are set to auto white balance (step S330). When CPU 31 determines that the value of the light source parameter is not 0 (No at step S330), it turns off the color balance automatic adjustment execution flag Fwb (Fwb=0) that permits execution of automatic image quality adjustment relating to color balance (this is sometimes also called white balance) (step S340). When a setting other than auto light source is made as the light source setting value, CPU 31 can judge that the person shooting the image decided to intentionally specify the light source, specifically, the white balance, and shot the image. Therefore, to reflect the intention of the person shooting the image, correction of the parameter values relating to color balance of the image data GD based on the reference values is prohibited. Note that the default value of the color balance automatic adjustment execution flag Fwb is 1 (on).

Meanwhile, when it is determined that the value of the light source parameter is 0 (Yes at step S330), CPU 31 keeps the color balance automatic adjustment execution flag Fwb on and moves to the next step.

CPU 31 references the value of the color balance automatic adjustment execution flag Fwb and sets an automatic image quality adjustment for the parameter value that will correct the characteristics parameter value obtained by analysis of the image data GD so that it will approach the changed reference value (step S350). When the color balance automatic adjustment execution flag Fwb is 1, automatic adjustment of image quality is executed for color balance.

An example of execution of automatic color balance adjustment is as follows. First, image data GD is analyzed, the distribution (histogram) of each component value of RGB (characteristics parameter values) is obtained, and the average value of the RGB component value is also obtained. Based on the obtained average value, the light source at the time of shooting (white point, white balance) is determined, and a reference value which is the optimal value as the average value for the determined light source is selected. The color skew of each component value of RGB in relation to the selected reference value is obtained, and the output level in relation to the input level or each component of RGB is adjusted using tone curve adjustment so that the color skew is eliminated.

Figure 12:
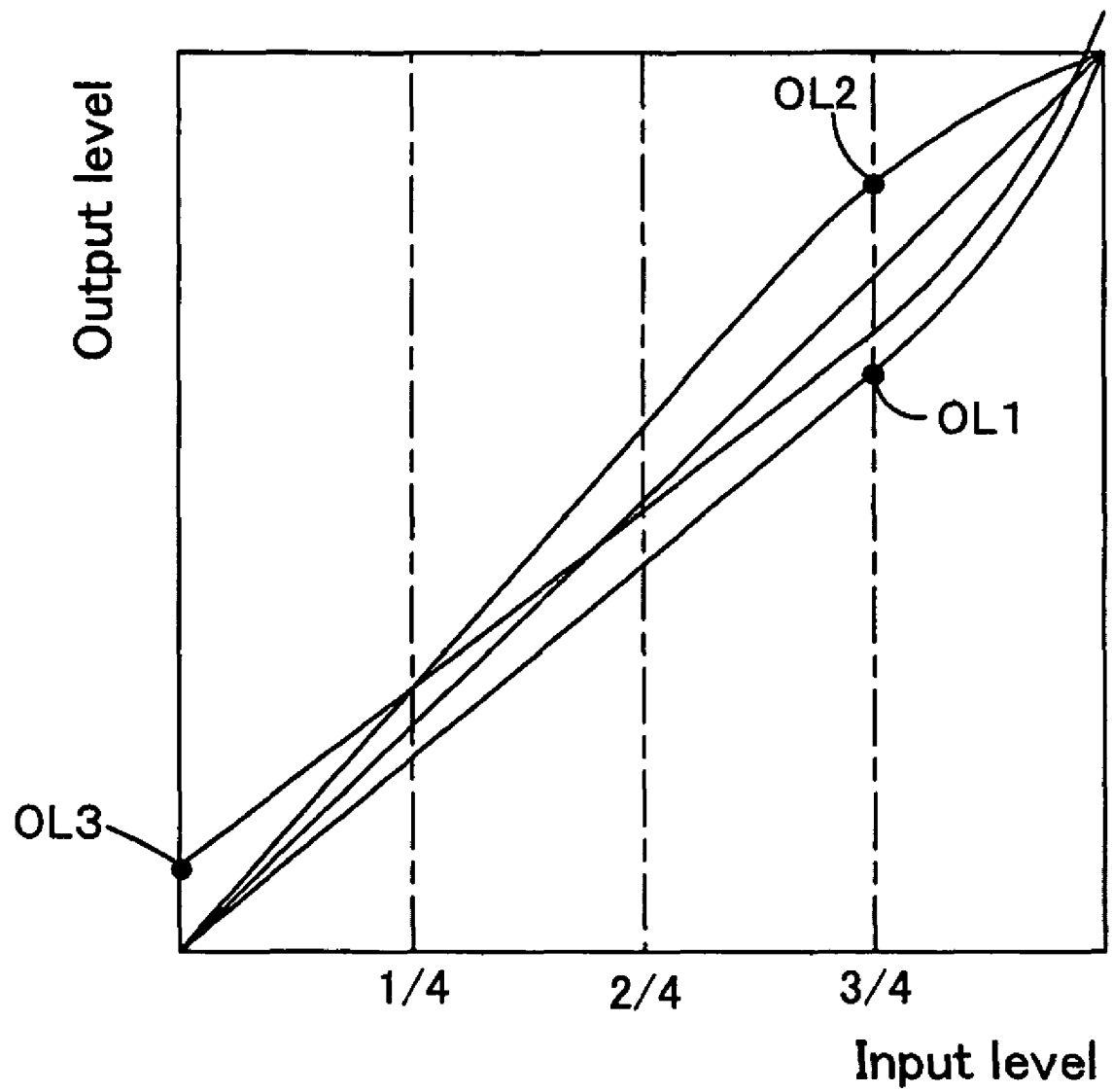
FIG. 12 is a graph that conceptually shows the relationship between the input level and output level for the R component of the RGB components.

The relationship between the input level and output level when color balance is corrected will be explained with FIG. 12. FIG. 12 is a graph that conceptually shows the relationship between the input level and output level for the R component of the RGB components. For example, when the R component is larger than the average value of the RGB components, the output level is lowered according to the level of color skew at the ¾ point of the input level (OL1). Meanwhile, when the R component is smaller than the average value of the RGB components, the output level is raised according to the level of color skew at the ¾ point of the input level (OL2). It is also possible to give an output value offset volume in relation to the input value according to the color skew (OL3). The value that excludes the point that corresponds to the correction level is interpolated using a spline curve.

When auto light source is set as the light source setting value, the person shooting the image can be judged to have not shot with emphasis placed on the light source (white balance), so even if the color balance of the image data GD is automatically adjusted to be optimal, there is no countering against the intention of the person shooting the image.

Meanwhile, when the color balance automatic adjustment execution flag Fwb is 0, automatic adjustment of image quality is not executed for color balance. For example, when images are shot under daylight conditions with the light sources set to fluorescent light, a reddish image is obtained, and the same kind of photographic effect as when shooting using a filter for silver salt photography can be obtained. In such a case, when color balance is corrected based on the reference value with automatic adjustment, there is a reduction in the photographic effect due to the intentional specification of the light source (white balance) and an output result that counters the intention of the person shooting the image is obtained. In contrast to this, with this embodiment, when the light source is specified, automatic adjustment of the color balance is not executed, so it is possible to execute automatic image quality adjustment that reflects the intention of the person shooting the image in relation to color balance.

CPU 31 reflects the values of the characteristics parameters that were automatically adjusted in the image data, and returns the color balance automatic adjustment execution flag Fwb to 1 which is the default value (step S360), and then returns to the image processing routine which is the main routine.

When the automatic image quality adjustment processing ends, CPU 31 executes wRGB color conversion processing and half tone processing for printing (step S250). With the wRGB color conversion processing, CPU 31 references the conversion lookup table (LUT) for converting to the CMYK color space that corresponds to the wRGB color space stored within ROM 31, and changes the color space of the image data from the wRGB color space to the CMYK color space. In other words, it converts image data made from the gradation values of R, G, and B to, for example, data of the six color gradation values of C, M, Y, K, LC, and LM that are used with color printer 20.

With half tone processing, the already color converted image data is taken and gradation count conversion processing is performed. With this embodiment, the image data after color conversion is expressed as data having 256 gradation widths for each color. In contrast to this, with color printer 20 of this embodiment, only the states of "form dots" or "don't form dots" can be used, so color printer 20 of this embodiment can only express two gradations locally. In light of this, image data having 256 gradations is converted to image data expressed by two gradations that can be expressed by color printer 20. As representative methods for this process of changing to two gradations (binarization), there is a method called the error diffusion method and a method called the systematic dither method.

With color printer 20, before doing color conversion processing, when the resolution of the image data is lower than the printing resolution, linear interpolation is performed to generate new data between adjacent image data, and conversely when it is higher than the printing resolution, resolution conversion processing that converts the image data resolution to the printing resolution is executed by culling data at a fixed rate. Also, color printer 20 executes interlace processing that realigns the image data converted to a format that shows whether there is dot formation into the sequence in which it is to be transferred to color printer 20.

As described above, with color printer 20 of this embodiment, it is possible to automatically adjust the image quality of image data GD to reflect the image output control information GI that is contained in the image file GF. Therefore, even when the image data output control conditions are selectively set by the user, the selective output control conditions are corrected by executing automatic image quality adjustment, making it possible to solve the problem of the prior art automatic image quality adjustment function of not being able to reflect the user's intentions.

In particular, with color printer 20 of this embodiment, when doing automatic adjustment of the image quality of the image data GD, when the light source, specifically the white balance, is specified, color balance is not automatically adjusted. Therefore, it is possible to obtain an output result that reflects the intention of the person shooting the image without losing the photographic effect brought by the light source (white balance) that was intentionally set by the person shooting the image.

It is also possible to automatically adjust the image quality using the image output control information GI contained in image file GF, so it is possible to easily obtain high quality printing results that reflect the photographic intentions of the user without performing image quality adjustment with a photo retouch application or the printer driver.

Also, with the embodiment noted above, an example of automatically executing image quality adjustment processing was explained, but it is also possible to provide an automatic image quality adjustment button on the operating panel of color printer 20, and execute the automatic image quality adjustment processing of the embodiment noted above only when automatic image quality adjustment is selected using this automatic image quality adjustment button.

F. Other Embodiments:

With the embodiment noted above, all image processing was executed with color printer 20 without going through a personal computer PC, and a dot pattern was formed on a printing medium according to the generated image data GD, but it is also possible to execute all or part of the image processing on a computer. In this case, this is realized by giving the image processing function explained while referring to FIG. 11 to an image data processing application such as a retouch application or printer driver installed on the computer's hard disk, etc. The image file GF that was generated with digital still camera 12 is provided to the computer via a cable or a memory card MC. On the computer, the application is started by an operation by the user, the image file GF is read, the image output control information GI is analyzed, and conversion and adjustment of image GD is executed. Another alternative would be that, by detecting insertion of the memory card MC, or by detecting insertion of a cable, the application starts automatically, image file GF is read, image output control information GI is analyzed, and conversion and adjustment of image data GD is executed automatically.

Also, with the embodiment noted above, automatic adjustment of image quality with a focus on color balance was explained, but besides this, it is also possible to execute automatic adjustment of image quality that reflects the image output control information GI on the characteristics parameters values of image data GD such as the shadow and highlight point, contrast, brightness, color saturation, and sharpness.

It is also acceptable to make it possible to select characteristics parameter values that execute automatic image quality adjustment. For example, parameter selection buttons or photo mode parameter selection buttons that combine specific parameters according to the subject can be provided on the color printer 20, and the parameters for executing automatic image quality adjustment can be selected using these selection buttons. Also, when automatic image quality adjustment is executed on a personal computer, the parameters for executing automatic image quality adjustment can be selected on the user interface of the printer driver or retouch application.

Figure 13:
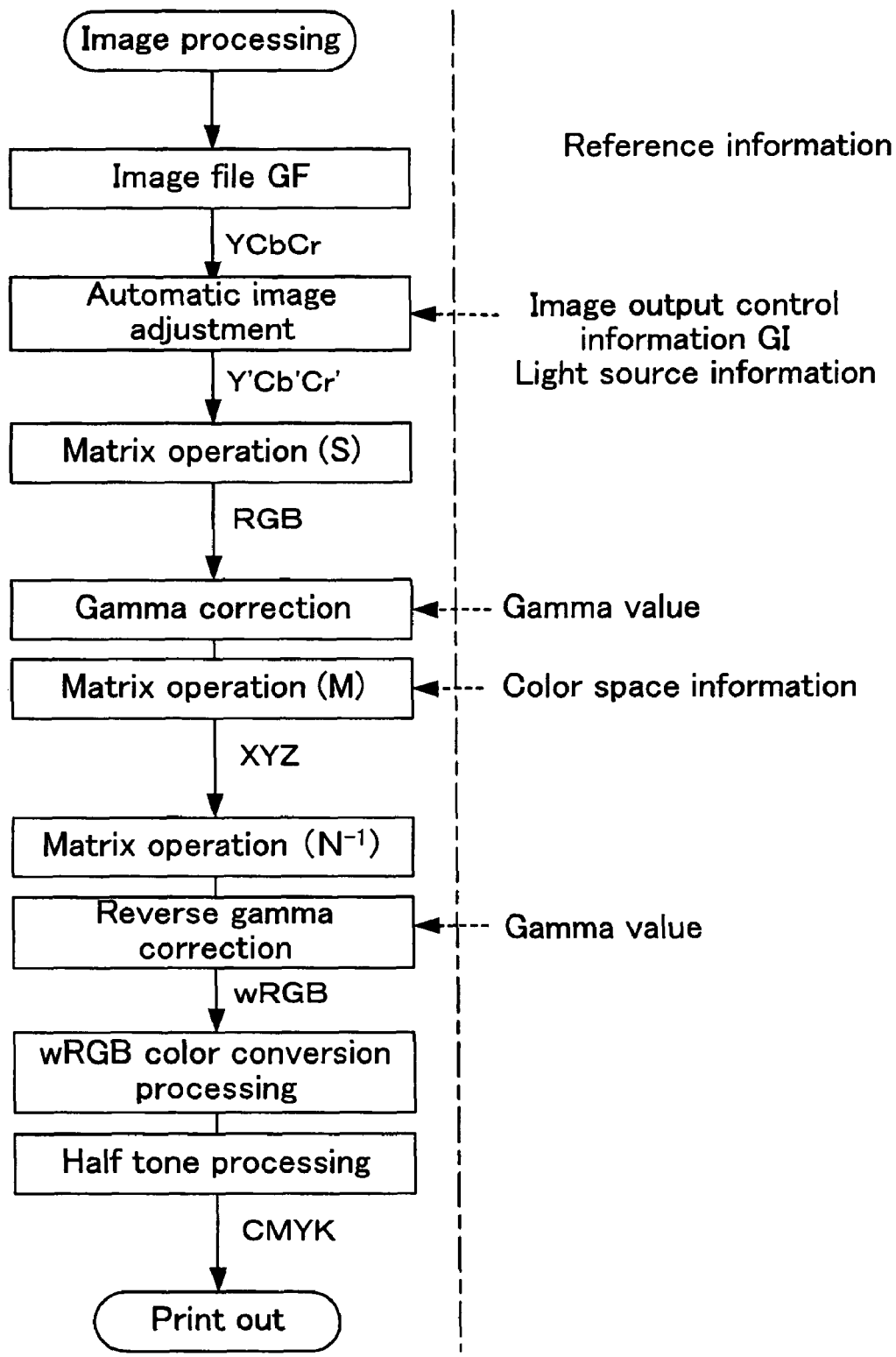
FIG. 13 is a flow chart that shows the processing routine of the printing process for color printer 20 of other embodiments.

The image processing with color printer 20 can execute automatic image quality adjustment processing first and then execute color space conversion as shown in FIG. 13. It is also acceptable to process basic information.

With the embodiment noted above, color printer 20 is used as the output device, but it is also possible to use a display device such as a CRT, LCD, or projector as the output device. In such a case, an image processing program (display driver) that executes image processing as explained using FIGS. 10 and 11, for example, can be executed by the display device as an output device. Alternatively, when a CRT, etc. is functioning as the display device of a computer, the image processing program is executed on the computer side. However, the finally output image data has an RGB color space rather than the CMYK color space.

In such a case, it is possible to reflect the image output control information GI at the time image data was generated in the display results on the CRT, etc. display device in the same way as when the information at the time of image data generation was reflected in the printing results via color printer 20.

Foregoing, the image output device of the present invention was explained based on a embodiment, but the embodiments of the invention noted above are for making the present invention easy to understand, and in no way limit the present invention. It is obvious that variations and improvements in the present invention can be obtained without straying from the scope or claims of the invention, and that equivalents are included in the present invention.

With the embodiment noted above, parameters including the light source, exposure correction volume, target color space, brightness, and sharpness as image output control information GI were used, but a user can decide freely what parameters to use as image output control information GI.

Also, the values of each parameter shown as examples in the table of FIG. 8 are nothing more than examples, and the invention of this application is not limited by these values. Furthermore, the values of matrix S, M, and $N^{-1}$ of the numerical formulas are also nothing more than examples, and it goes without saying that suitable changes can be made using something like a usable color space for color printer 20.

With the embodiment noted above, an explanation using digital still camera 12 was used as the image file generating device, but besides this, it is also possible to use devices such as a scanner or digital video camera. When using a scanner, it is possible to execute specification of the fetched data information of image file GF on the computer PC, or to provide preset buttons that allocate preset information for information settings as well as a display screen and setting buttons for making settings freely on the scanner, so that execution is possible using the scanner alone.

With the embodiment noted above, an example of an Exif format file was used as the specific example of image file GF, but the format of the image file for the present invention is not limited to this. In other words, it is acceptable as long as the image file contains image data generated on the image data generating device and image output control information GI that describes the conditions (information) when the image data was generated. As long as it is this kind of file, it is possible to appropriately automatically adjust the image quality of image data generated on the image file generating device and output it from the output device.

Digital still camera 12 and color printer 20 used in the embodiment noted above are nothing more than examples, and their structure does not limit the noted contents of each embodiment. For digital still camera 12, it is acceptable to at least provide the function of being able to generate image file GF of the embodiment noted above. For color printer 20, it is acceptable to at least analyze the image output control information GI of the image file GF of this embodiment, automatically adjust the image quality to reflect the intention of the user in relation to color balance in particular, and to output (print) the image.

With the embodiment noted above, image data GD and image output control information GI were contained in the same image file GF, but image data GD and image output control information GI do not necessarily have to be stored in the same file. In other words, it is acceptable if the image data GD and image output control information GI are correlated, and for example, association data that associates image data GD and image output control information GI can be generated, one or multiple image data and image output control information GI can each be independently stored in a file, and when image data GD is processed, its correlated image output control information GI can be referenced. In this case, though the image data and image output control information GI are stored in separate files, at the point of image processing that uses image output control information GI, the image data and image output control information GI are in a unified, inseparable relationship, because they have essentially the same function as when they are stored in the same file. In other words, at least at the point of image processing, an embodiment for which image data and image output control information GI are used associated with each other is included in the image file GF of this embodiment. Furthermore, animated image files stored on optical disk media such as CD-ROM, CD-R, DVD-ROM, and DVD-RAM are also included.

What is claimed is:

1. An output device that outputs an image using image data and white balance information on white balance set at the time of generating the image data, the white balance information being associated with the image data, the output device comprising:

an image data acquisition unit that acquires the image data;
a white balance information acquisition unit that acquires the white balance information associated with the image data acquired by the image data acquisition unit; and
an output unit that outputs the image using the image data color balance thereof adjusted when the white balance information is auto white balance information, and that outputs the image using the image data the color balance thereof not adjusted when the white balance information is not the auto white balance information.

2. An output device that outputs an image using image data and white balance information on white balance set at the time of generating the image data, the white balance information being associated with the image data, the output device comprising:
an image data acquisition unit that acquires the image data;
a white balance information acquisition unit that acquires the white balance information associated with the image data acquired by the acquisition unit; and
an output unit that outputs the image using the image data color balance thereof adjusted at a particular level when the white balance information is auto white balance information, and that outputs the image using the image data the color balance thereof adjusted at a lower level than the particular level when the white balance information is not the auto white balance information.

3. An output device in accordance with claim 1 or 2 further comprising:
an image quality parameter value obtaining unit that obtains an image quality parameter value that indicates the characteristic of the image data,
wherein the output unit adjusts the color balance of the image data based on the obtained image quality parameter value and on a preset reference image quality parameter value.

4. An output device in accordance with claim 3, wherein the output unit calculates color balance adjustment volume from the reference image quality parameter value and the image quality parameter value, modifies the color balance adjustment volume based on the white balance information, and adjusts the color balance of the image data using the modified color balance adjustment volume.

5. An output device in accordance with claim 3, wherein the output unit adjusts the color balance of the image data based on the white balance information to reduce the difference between the reference image quality parameter value and the image quality parameter value.

6. An output device in accordance with claim 3, wherein the output unit adjusts the color balance of the image data based on the white balance information to eliminate the difference between the reference image quality parameter value and the image quality parameter value.

7. An output device in accordance with claim 3 further comprising:
a reference image quality parameter value modification unit that modifies the reference image quality parameter value,
wherein the output unit adjusts the color balance of the image data based on the modified reference image quality parameter value and on the obtained image quality parameter value.

8. An output device in accordance with claim 1 or 2, wherein the output device comprises a printer that prints the image.

9. An output device in accordance with claim 1 or 2, wherein the output device comprises a display device that displays the image.

10. An output device in accordance with claim 1 or 2, wherein the image data and the white balance information are contained in a same image file.

11. An output method of outputting an image using image data and white balance information on white balance set at the time of generating the image data, the white balance information being associated with the image data, the output method comprising:
acquiring the image data;
acquiring the white balance information associated with the image data that is acquired; and
outputting the image using the image data color balance thereof adjusted when the white balance information is auto white balance information, and outputting the image using the image data the color balance thereof not adjusted when the white balance information is not the auto white balance information.

12. An output method of outputting an image using image data and white balance information on white balance set at the time of generating the image data, the white balance information being associated with the image data, the output method comprising:
acquiring the image data;
acquiring the white balance information associated with the image data that is acquired; and
outputting the image using the image data color balance of the image adjusted at a particular level when the white balance information is auto white balance information, and outputting the image using the image data the color balance of the image adjusted at a lower level than the particular level when the white balance information is not the auto white balance information.

13. An output method in accordance with claim 11 or 12 further comprising:
obtaining an image quality parameter value that indicates the characteristic of the image data,
wherein the outputting the image includes adjusting the color balance of the image data based on the obtained image quality parameter value and on a preset reference image quality parameter value.

14. An output method in accordance with claim 13, wherein the outputting the image includes calculating color balance adjustment volume from the reference image quality parameter value and the image quality parameter value, modifying the color balance adjustment volume based on the white balance information, and adjusting the color balance of the image data using the modified color balance adjustment volume.

15. An output method in accordance with claim 13, wherein the outputting the image includes adjusting the color balance of the image based on the white balance information to reduce the difference between the reference image quality parameter value and the image quality parameter value.

16. An output method in accordance with claim 13, wherein the outputting the image includes adjusting the color balance of the image based on the white balance information to eliminate the difference between the reference image quality parameter value and the image quality parameter value.

17. An output method in accordance with claim 13 further comprising:
modifying the reference image quality parameter value,
wherein the outputting the image includes adjusting the color balance of the image data based on the modified reference image quality parameter value and on the obtained image quality parameter value.

18. An output device that outputs an image using image data and white balance information on white balance set at the time of generating the image data, the white balance information being associated with the image data, the output device comprising:
- an image data acquisition unit that acquires the image data;
- a white balance information acquisition unit that acquires the white balance information associated with the image data acquired by the acquisition unit; and
- an output unit that outputs the image using the image data color balance thereof not adjusted when the white balance information is not auto white balance information.

19. An output method of outputting an image using image data and setting information being set at the time of generating the image data, the setting information being associated with the image data, the output method comprising:
- determining whether the setting information indicating a image data generating apparatus confirms and sets white balance;
- calculating correction level of color balance of the image data; and
- outputting the image using the image data color balance thereof adjusted based on the correction level that is calculated.

* * * * *